United States Patent

Wessel

[11] Patent Number: 5,458,174
[45] Date of Patent: Oct. 17, 1995

[54] THREADEDLY ENGAGEABLE TIRE STUD

[75] Inventor: Rolf E. Wessel, Sarasota, Fla.

[73] Assignee: Bruno Wessel, Inc., Sarasota, Fla.

[21] Appl. No.: 259,466

[22] Filed: Jun. 14, 1994

[51] Int. Cl.⁶ ..................................................... B60C 11/16
[52] U.S. Cl. .......................... 152/210; 36/59 R; 36/67 B; 36/67 C
[58] Field of Search ...................... 152/210, 169, 152/222; 36/65, 67 C, 67 B, 62, 59 R

[56] References Cited

U.S. PATENT DOCUMENTS

| | | | |
|---|---|---|---|
| 2,535,299 | 12/1950 | Leach et al. | 152/186 |
| 2,627,888 | 2/1953 | Bull | 152/210 |
| 3,120,863 | 2/1964 | Coate | 152/210 |
| 3,124,191 | 3/1964 | Forslund | 152/210 |
| 3,230,996 | 1/1966 | Hakka | 152/210 |
| 3,407,860 | 10/1968 | Mossberg | 152/210 |
| 3,473,591 | 10/1969 | Bingham | 152/210 |
| 3,538,970 | 11/1970 | Shwayder | 152/210 |
| 3,747,659 | 7/1973 | Caniz | 152/210 |
| 5,234,266 | 8/1993 | Musselman et al. | 305/54 |

FOREIGN PATENT DOCUMENTS

| | | |
|---|---|---|
| 85665 | 6/1958 | Denmark . |
| 1342665 | 2/1964 | France . |

Primary Examiner—Michael W. Ball
Assistant Examiner—Francis J. Lorin
Attorney, Agent, or Firm—Anthony J. Casella; Gerald E. Hespos

[57] ABSTRACT

A threadedly engageable tire stud includes an elongated steel housing having a hexagonal head section and a threaded section of enlarged pitch for securely engaging a tire thread wherein the head section has approximately the same diameter as a major diameter of the threaded section. A longitudinally extended aperture is provided in the hexagonal head section for receiving an elongated carbide pin. The carbide pin is brazed to the elongated steel housing and protrudes out of the head section of the housing for engaging the road surface to improve traction of the tire.

7 Claims, 2 Drawing Sheets

THREADEDLY ENGAGEABLE TIRE STUD

BACKGROUND OF THE INVENTION

Tire studs give a vehicle traction when going over ice and hard-parked snow. Tire studs are installed, for example, on an all-terrain vehicle's tires when driving in the polar ice caps.

Many patents have been issued with respect to tire studs or anti-skid devices. An early tire traction device is described, for example, in U.S. Pat. No. 2,535,299 which was issued to A. Leach et al. on Dec. 26, 1950 and is entitled "Tire Traction Cover." This patent consists of a flexible band disposed about the tire and having tire studs mounted on its outer surface. U.S. Pat. No. 2,535,299 also discloses belt straps which enable the flexible band to be strapped onto the tire. There are several shortcomings with the device of U.S. Pat. No. 2,535,299. First, the flexible band on which the tire studs are mounted must be manufactured in many sizes to account for different-sized tires, both with respect to the width of the rubber tire tread and the tire circumference. A second shortcoming is that when a stud disengages from the flexible band it is not readily possible to mount another stud to take its place. Therefore, if a group of studs, in one particular location on the flexible band disengage, then the tire would not have traction in that particular area of the traction cover and would render the entire device useless.

Another prior art device is disclosed in U.S. Pat. No. 2,627,888 which issued to A. W. Bull and includes a tire tread having an adjustable traction device. This device is similar to the device of U.S. Pat. No. 2,535,299 in that the studs are mounted by the manufacturer on a particular surface which is later connected to the tire. The only difference is that in U.S. Pat. No. 2,627,888 the surface that the studs are mounted into is the actual tire tread and in U.S. Pat. No. 2,535,299 the surface is a flexible band which is strapped over the tire tread. Just as in U.S. Pat. No. 2,535,299, there are several shortcomings with U.S. Pat. No. 2,627,888. A prime disadvantage is that the user has to unthread the anti-skid devices from the tire tread by hand, since they are embedded inside the tire tread. This is a difficult task, since the anti-skid devices are usually flush with respect to the tire tread, due to road wear of the anti-skid devices. In addition, it is often difficult to unthread these anti-skid devices when mud, dirt, or snow encapsulates them. But a main shortcoming of U.S. Pat. Nos. 2,535,299 and 2,627,888 is that they disclose anti-skid contraptions which do not allow for replacement studs once the existing studs are disengaged or damaged.

Danish Patent No. 85,665 issued to Victor Peche on Jun. 2, 1958 and discloses an individual anti-skid device which is embedded in the rubber tire tread of a vehicle's tire. A shortcoming of this device is that the portion which is embedded into the tire tread resembles a tiny spike. The part of the anti-skid device which protrudes out of the anti-skid device is a conical head which is barely attached to the spike portion. Perpetual tire rotation could cause the device to rip out of the rubber tire tread, and could also tear the conical head from the spike portion, thus leaving the spike stuck in the tire tread where it plays no function.

A U.S. patent which discloses a tire traction device, whereby each individual device is separate and independent of one another was issued to W. B. Coate on Feb. 11, 1964, U.S. Pat. No. 3,120,863. U.S. Pat. No. 3,120,863 discloses a tire traction device resembling an ordinary screw which is threaded to the tire tread of a vehicle's tire. U.S. Pat. No. 3,120,863 discloses that the traction device is threaded on the sides of the tire tread and not in the front side of the tire tread. A major shortcoming of this device is that tire rotation easily rips the device out of the rubber tire tread, leaving a hole in the rubber tire tread and even possibly damaging the tire tread if the anti-skid device rips out sideways.

Both Danish Patent No. 85,665 and U.S. Pat. No. 3,120,863 disclose threaded, screw-like devices which tend to be unstable when embedded in the rubber portion of tire and tire rotation could cause them to be ripped out of the tire. These anti-skid devices rip out of the rubber tire tread primarily because the threaded portion which is embedded in the tire has a conventional pitch between threads and the rubber is thus unable to fully grip the device. In addition, the head of these devices is not configured to withstand a large amount of weight, and therefore, are not suitable for use on tires of heavy vehicles, such as military vehicles or trucks.

A threaded tire stud with a conventional pitch is prone to forming air cavities along the thread-pitch boundaries as it is embedded in a rubber tire tread. This is due to the fact that because of its elasticity characteristics, the rubber is unable to fully and intimately adhere to the entire surface of a threaded anti-skid device having a conventional pitch. The air cavities which are thus formed in the rubber tire tread cause the anti-skid device with conventional pitch to be unstable and susceptible to dislodgement.

The phenomenon which causes rubber to elastically adhere to the surface of a device which is embedded in it is called the flange effect. Therefore, a threaded anti-skid device with conventional pitch, is not fully prone to the flange effect and may easily rip out of the rubber tire tread. Further still, one may easily remove an anti-skid device which is not fully prone to the flange effect from the rubber tire tread by a simple pull. However, an anti-skid device which is completely under the influence of the flange effect requires a tool to remove, because it is strongly held in place.

In addition, there are prior art anti-skid devices which require installation using a custom-made tool, which is usually retro-fitted with pressure gauges and air pumps, to embed the anti-skid devices into the rubber tire tread. This necessitates that the anti-skid devices be embedded at a location where such custom-made tools can be found, such as in a garage or an auto repair shop. Therefore, a driver who does not have readily available access to such a custom-made tool, has no remedial recourse if he suddenly finds himself driving in icy conditions or hard-packed snow.

In view of the shortcomings of the prior art anti-skid devices, it is an object of the subject invention to provide an improved, durable, threadedly engageable, and more stable tire stud.

It is a further object of the subject invention to provide a tire stud that can be easily varied as to the length the head portion protrudes from the rubber tire tread.

It is a further object of the subject invention to provide a tire stud that is particularly effective in withstanding pressure due to the weight of the vehicle.

Still a further object of the subject invention is to provide a tire stud that is threaded in a rubber tire tread without the need of a custom-made tool.

SUMMARY OF THE INVENTION

The subject invention is directed to a threadedly engageable tire stud to improve a vehicle's traction when going over ice and hard-packed snow. The threadedly engageable tire stud of the subject invention includes an elongated steel housing which has a hexagonal head section and a threaded section which is embedded into the tire thread. The steel housing gives the device durability and leverage to support light and heavy vehicles. In the center of the head section of said steel housing is an aperture which extends approximately half-way through the length of the longitudinal axis of said head section. A carbide pin is inserted into this aperture and connected therein, preferably by brazing. Preferably two millimeters of the carbide pin protrude out from the steel housing to make contact with the road. Since the carbide pin makes contact with the road, instead of the steel housing, it allows for extended-use of the threadedly engageable tire stud since the carbide pin wears less quickly than the steel housing. In fact, when the part of the steel housing which does make contact with the road, due to rotation of the tire, is worn, the carbide pin protruding from said steel housing hardly decreases in size.

The lower section of the threadedly engageable tire stud is threaded, with the spacing between adjacent threads being exaggerated or enlarged to provide a wider pitch as compared to conventional pitch configurations. The subject structural configuration enables the rubber, which comprises the rubber tire tread, to fully adhere to the threaded portion of the tire stud and thereby create a desirable flange effect which strongly holds the threadedly engageable tire stud of the subject invention in place. This structural configuration gives the threadedly engageable tire stud greater stability, as compared to prior art devices, and also prevents the subject tire stud from being dislodged from the rubber tire tread. In addition, there is an additional surface area between the hexagonal, head section and the threaded section of the subject stud which also contributes to the flange effect, thereby giving the subject tire stud further stability.

Moreover, the threaded design and long, hexagonal head portion of the subject tire stud allows one to use conventional tools, such as a wrench, to thread the threadedly engageable tire stud into a rubber tire tread. Therefore, one can thread the threadedly engageable tire studs of the subject invention into a rubber tire tread virtually anywhere. Furthermore, with conventional tools one can vary the length the head section protrudes out of the rubber tire tread to accommodate the amount of traction desired, even in the middle of no apparent civilization, such as the snow and ice covered regions of Antarctica.

As discussed above, the subject invention achieves several very significant advantages. Its enlarged pitch configuration, as compared to conventional pitch threads, enables the rubber, in the tire tread, to fully adhere to the surface of the anti-skid device, thereby creating a multi-flange effect, and thereby, stabilizing the subject tire stud. A tapered transitional area between the head section and the threaded section also contributes to the flange effect and further increases the stability of the threadedly engageable tire stud of the subject invention.

The subject invention satisfies all the objectives mentioned earlier. The elongated head section of the subject tire stud allows the protrusion length of the head section to be varied according to the amount of traction desired or according to the thickness of the rubber tire tread. Furthermore, the invention disclosed herein is a durable anti-skid device that is effective in withstanding the downward pressure due to a vehicles's weight. In addition, the subject invention allows for greater stability as compared to prior art devices.

DETAILED DESCRIPTION OF THE PREFERRED EMBODIMENT

Figure 1:
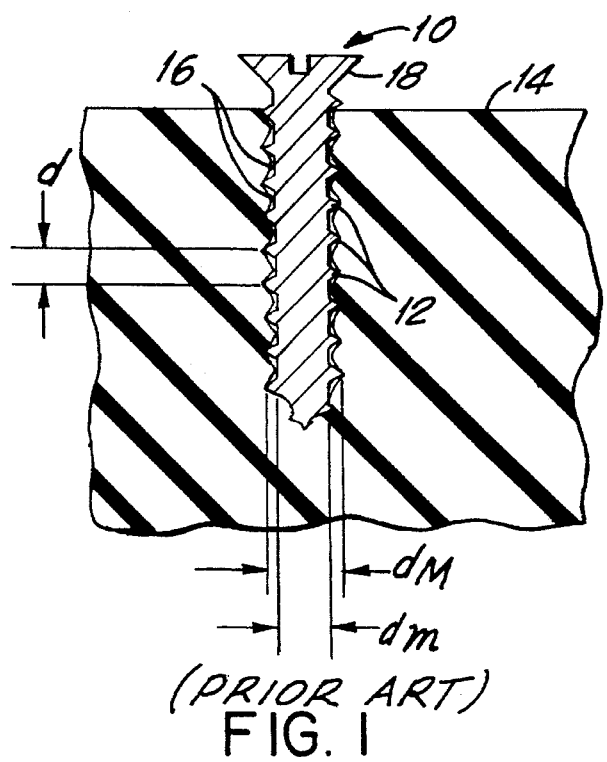
FIG. 1 is a cross-sectional view of a prior art tire stud embedded in the rubber tread portion of a rubber tire.

Before describing the threadedly engageable tire stud of the subject invention, reference will be made to a prior art threaded tire stud as illustrated by FIG. 1. The prior art threaded tire stud is indicated generally by the reference numeral 10. In FIG. 1 the letter "d" designates the spacing between corresponding points on adjacent thread profiles of stud 10 and is usually referred to as the pitch of the threads 12. The notation "$d_M$" notes the major diameter of the threaded portion of stud 10, while the notation "$d_m$" designates the minor diameter of the threaded portion of the prior art tire stud 10. The major diameter ($d_M$) of the prior art tire stud 10, as evident from FIG. 1, is not significantly larger than the minor diameter ($d_m$). In a typical threaded tire stud of the type shown in FIG. 1, the major diameter ($d_M$) is approximately 13% larger than the minor diameter ($d_m$). In addition, the threads 12 of the prior art tire stud 10 are closely spaced, which creates a relatively small pitch "d". These two characteristics of the prior art tire stud 10 make it less prone to achieving a maximum flange effect when tire stud 10 is threadedly embedded into a rubber tire tread 14. In effect, during installation of the threaded tire stud 10 into the rubber tire tread 14, the rubber is unable to fully and intimately grip the threads 12 of the tire stud 10. This shortcoming of the prior art tire stud 10 to achieve the flange effect results in the formation of air cavities 16. It is the formation of these air cavities 16 in the rubber tire tread 14 which causes the prior art tire stud 10 to be loosely held in place, and therefore unstable. Since the prior art tire stud 10 is unstable, tire rotation could easily result in the stud 10 being ripped out of the rubber tire tread 14. In addition, the head 18 of the prior art tire stud 10 is generally not configured to allow its projected length to be varied or to be able to withstand a large amount of weight, without causing movement of the tire stud 10.

Figure 2:
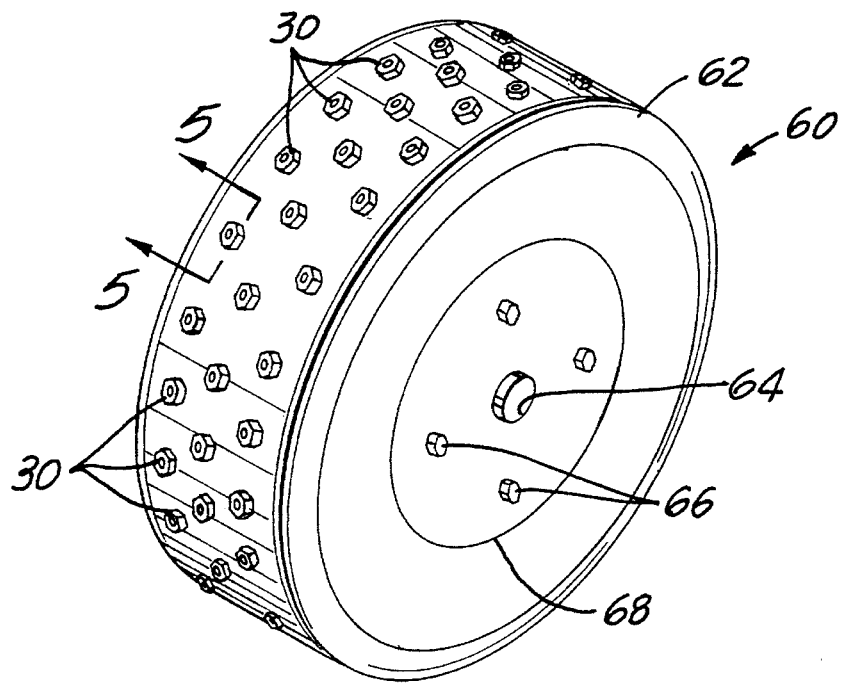
FIG. 2 is a perspective view of a rubber tire including a plurality of threadedly engageable tire studs of the subject invention.

The subject threadedly engageable tire studs as mounted in a tire is illustrated in FIG. 2. A plurality of threadedly engageable tire studs 30 according to the subject invention are threaded into the rubber tire tread 62 of a tire 60 for affording the tire 60 traction when going over ice and hard-packed snow. An aperture 64 centrally aligned with the horizontal axis of the tire 60 and the bolts 66 on the tire rim 68 enable the tire 60 to be connected to a vehicle (not shown).

Figure 4:
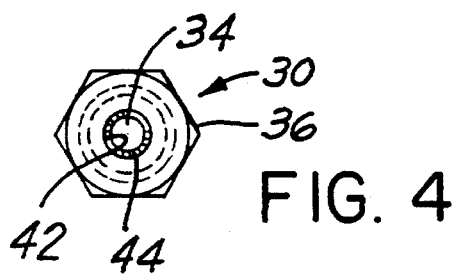
FIG. 4 is a top plane view of the threadedly engageable tire stud of the subject invention.
Figure 3:
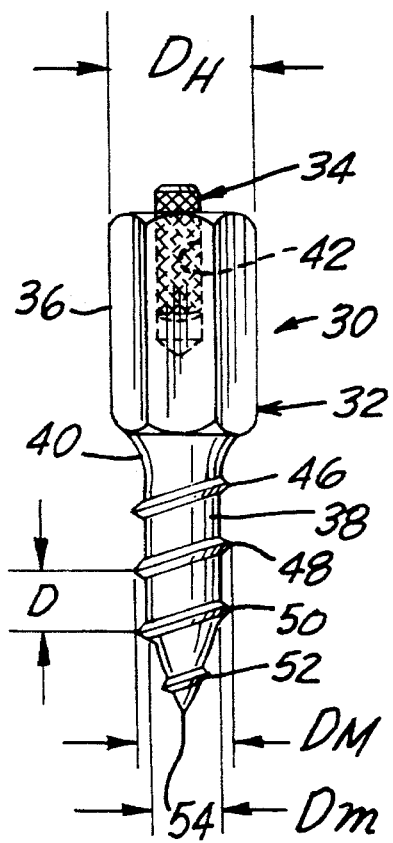
FIG. 3 is a side elevational view of the threadedly engageable tire stud of the subject invention.

Turning to FIGS. 3 and 4, the threadedly engageable tire stud 30 of the subject invention includes the combination of a unitary elongated steel housing 32 and a carbide pin 34. The steel housing 32 is formed of two sections: a head section 36 and a threaded section 38. The transition area 40 in the steel housing 32 between the head section 36 and the threaded section 38 is tapered. The elongated, steel housing 32 further includes a central aperture 42 extending approximately half-way along the longitudinal axis of the head section 36, and is preferably 63% the length of the threaded section 38. The carbide pin 34 is fixed into aperture 42 by brazing to the steel housing 32. This method of connection forms a brazing line 44 (see FIG. 4) between the surface of the steel housing 32 and the carbide pin 34. Preferably, approximately twenty-five percent of the length of the carbide pin 34 protrudes out of the steel housing 36 for engaging the surface of the road.

The head section 36 is of elongated, hexagonal configuration while the threaded section 38 includes a plurality of helical threads 46–52 which terminate at a sharp point 54 approximately 10–25 mm below the head section 36. The threaded section 42 is single-threaded, i.e., the lead is equal to the pitch, designated by the letter D. The pitch of a thread is the axial distance that the helix advances in one turn. A single-threaded tire stud is best when high mechanical advantage is the prime requisite.

The pitch D is significantly enlarged as compared to the pitch d of the threads of the prior art tire stud 10, as shown in FIG. 1, and the major diameter ($D_M$) is substantially larger compared to the minor diameter ($D_m$). As described in detail below, this enables the rubber of the tire tread to more fully and intimately adhere to the surface of the steel housing 32.

Preferably, the length of the head section 36 is approximately 43% of the total length of the tire stud 30, and the length of the threaded section 38 is approximately 47% of the total length of the tire stud 30. Preferably, the length of the transition area 40 between the head section 36 and the threaded section 38 is approximately 9% of the total length of the tire stud 30.

Figure 5:
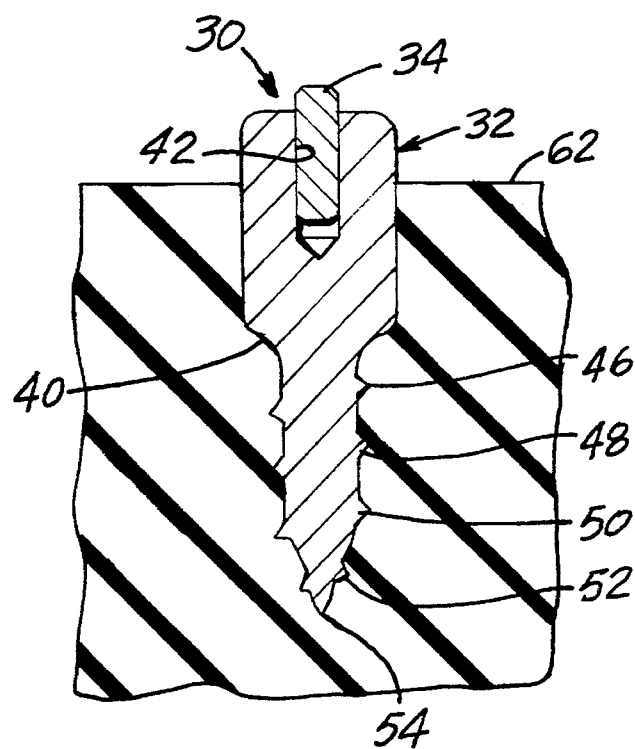
FIG. 5 is a cross-sectional view taken along line 5—5 in FIG. 2.

In the preferred embodiment of the threadedly engageable tire stud 30 as shown in FIGS. 3–5, the carbide pin 34 is cylindrical and measures eight millimeters in length, while the total length of the elongated steel housing 32 measures approximately 33 mm. The head section 36 measures 14 mm and the threaded section 38 measures 16 mm. The transition area 40 between the head section 36 and the threaded section 38 measures three millimeters. Approximately two millimeters of the carbide pin 34 protrudes out of the steel housing 32. Therefore, the preferred embodiment of the subject tire stud 30 measures 35 mm from the distal end of the carbide pin 34 to the sharp point 54 on the bottom of the threaded section 38.

The pitch D of the preferred embodiment measures approximately four millimeters, with the major diameter ($D_M$) of the threaded section 38 measuring approximately 10 mm, while the minor diameter ($D_m$) of the threaded section 38 measures approximately six millimeters.

The threaded section 38 of the preferred embodiment of the threadedly engageable tire stud 30 begins approximately three millimeters below the head section 36 and terminates at the sharp point 54 approximately 19 mm below the head section 36. The pitch D of the threaded section 38 is approximately 40% of the diameter ($D_H$) of the head section 36 and extends approximately 25% of the length of the threaded section 38.

The major diameter ($D_M$) of the threaded section 38 is approximately equal to the diameter ($D_H$) of the head section 36. The minor diameter ($D_m$) of the threaded section 38 is approximately 60% of the diameter ($D_H$) of the head section 36. Furthermore, preferably, the major diameter ($D_M$) is 40% larger than the minor diameter ($D_m$) of the subject tire stud 30.

The substantially large major diameter ($D_M$), compared to the minor diameter ($D_m$), and the significantly enlarged pitch D, compared to the configuration of the prior art tire stud 10, enables the rubber of the rubber tire tread 62 to fully and intimately adhere to the entire embedded surface of the steel housing 32 of the subject invention. More particularly, as shown in FIG. 5, as installed in a tire thread 62, no cavities are formed at the interfaces between the rubber and the threads 46–52 of the threadedly engageable tire stud 30. In short, the design of the subject tire stud 30 allows the rubber to completely fill the spaces between threads 46–52 and not form any air cavities which would weaken the connection between the tire stud 30 and the rubber tire. Moreover, the enlarged threads 46–52 give the subject tire stud 30 support and stability when it is embedded in the rubber tire tread 62 due to the flange effect. Since installation of the subject tire stud 30 achieves the flange effect, continual tire rotation does not easily rip the tire stud 30 out of the rubber tire tread 62. Therefore, unlike the prior art tire stud 10, the threadedly engageable tire stud 30 provides a vehicle with traction for a much longer duration.

With respect to all embodiments of the subject invention, the head section 36 is in the range of 36–46% of the total length of the tire stud 30, while the threaded section 38 is in the range of 43–53% of the total length of the tire stud 30, with the transition area 40 between the head section 36 and the threaded section 38 being in the range of 5–15% of the total length of the tire stud 30. The longitudinally extending aperture 42 in the head section 36 is in the range of 65–75% of the length of said head section 36 and in the range of 57–67% of the length of said threaded section 36. The length of the carbide pin 34 which is brazed to the head section 36 is in the range of 44–64% of the length of the head section 36 and in the range of 45–55% of the length of the threaded section 38.

The hexagonal configuration of the head section 36 enables one to use conventional tools, such as a wrench, to embed and remove the subject tire stud 30 in a rubber tire tread 62. The wear-resistant carbide pin 34 brazed in the central aperture 42 of the head section 36 directly contacts the road, and its superior wear characteristics permits the subject threadedly engageable tire stud 30 to be functional over an extended period of time.

Turning again to FIG. 5, in a typical installation of the subject tire stud 30 as threaded into rubber tire tread 62, the head section 36 protrudes external to the surface of the tire thread. The rubber encircles the threads 46–52 to create a multi-flange effect, and thus stabilizes the device 30. In addition, the tapered transition area 40 below the head section 36 and the first thread 46 in the threaded section 38 also contributes to the flange effect, and thus provides additional stability to the threadedly engageable tire stud 30. The strong holding forces attributable to the flange effect make it difficult to disengage the threadedly engageable tire stud 30 once it is embedded in the rubber tire tread.

Preferably, for installation purposes a four-to-six millimeter-diameter hole may first be drilled in the rubber tire tread 62, before threading the subject tire stud 30 into the rubber tire tread. The threadedly engageable tire stud 30 is partially placed into this hole and threaded therein, using conventional tools, such as a wrench, while leaving approximately one-half the head section 36 protruding from the tire. The elongated head section 36 of the subject invention enables one to vary the protrusion length according to the amount of traction desired or the thickness of the rubber tire tread. Moreover, the entire head section 36 can be embedded in the rubber tire tread 62, thereby leaving only the wear-resistant carbide pin 34 protruding from the rubber tire tread.

While the subject invention has been described with respect to a preferred embodiment, it is apparent that various changes can be made without departing from the scope of the invention, as defined by the appended claims.

What is claimed is:

1. A threadedly engageable tire stud for threading into a rubber tire tread of a tire, said tire stud comprising:

an elongated housing, including a head section and a threaded section, said head section having a longitudinally extending aperture and a plurality of longitudinally extending side walls, with the pitch of said threaded section being approximately equal to the radius of said threaded section, and with the major diameter of said threaded section being approximately equal to the diameter of said head section; and an elongated, wear-resistant pin partially disposed in said aperture and fixedly connected to said elongated longitudinal housing, with one end of said pin protruding from said housing for traction purposes.

2. A tire stud as in claim 1, wherein the elongated housing is of unitary steel construction.

3. A tire stud as in claim 2, wherein the elongated, wear-resistant pin is brazed to said steel housing, forming a brazing line between the steel housing and the elongated, wear-resistant pin.

4. A tire stud as in claim 1, wherein the cross-section of the head section of the longitudinal housing is a hexagonal.

5. A tire stud as in claim 1, wherein the elongated, wear-resistant pin is made out of carbide.

6. A tire stud as in claim 1, wherein said longitudinally extending aperture in the head section extends approximately one half of the length of said head section.

7. A tire stud as in claim 1, further including a tapered transition area between said head section and said threaded section.

* * * * *